W. A. SEXTON.
POULTRY DRINKING FOUNTAIN.
APPLICATION FILED JAN. 25, 1911.
1,005,659.
Patented Oct. 10, 1911.
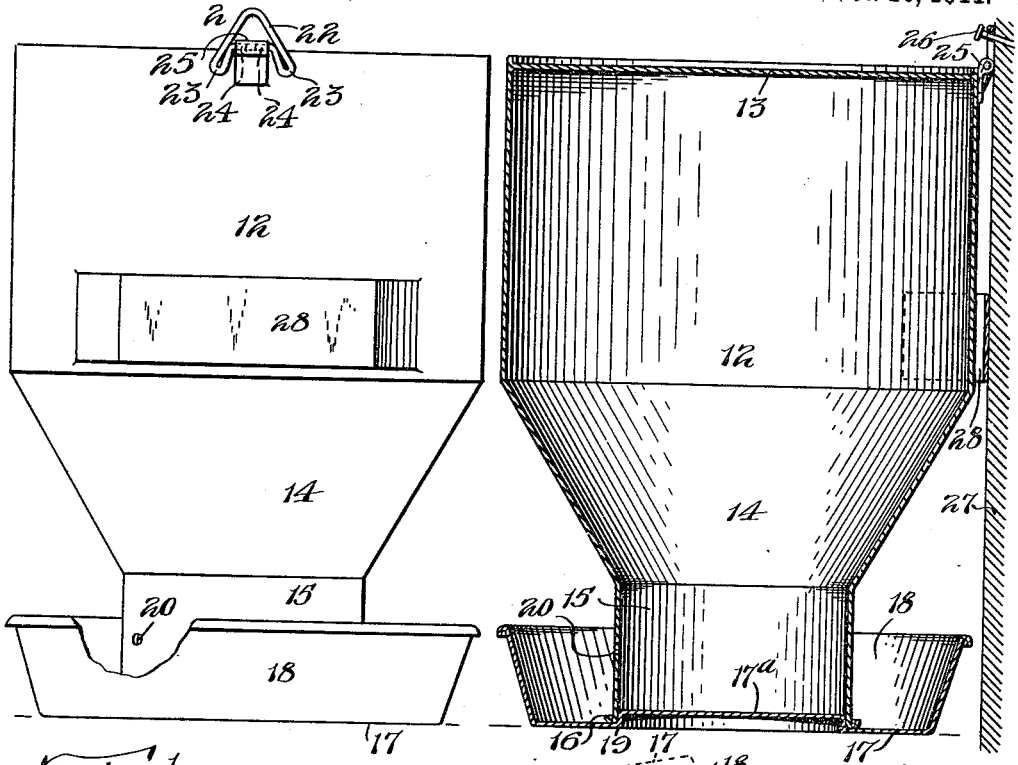
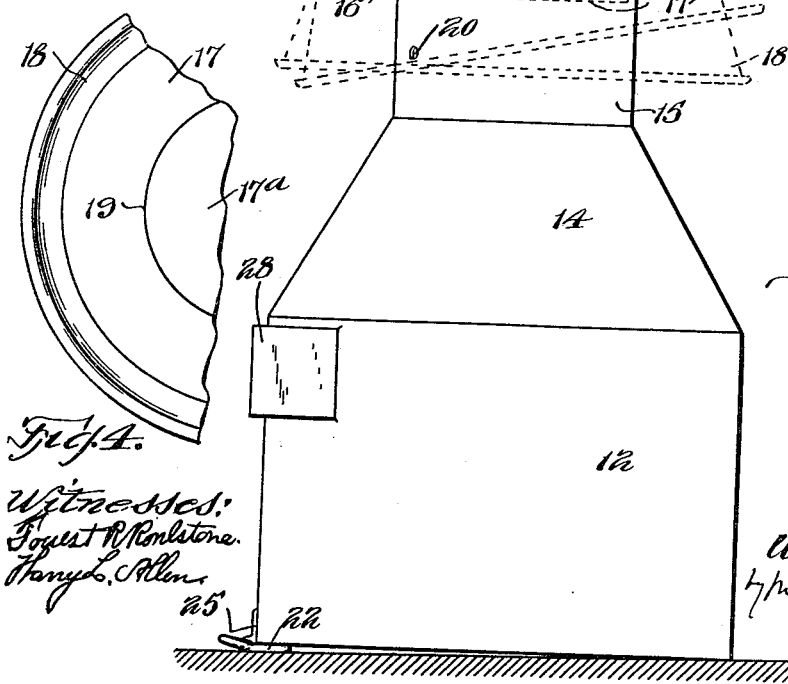

UNITED STATES PATENT OFFICE.

WILLIAM A. SEXTON, OF SOMERVILLE, MASSACHUSETTS.

POULTRY DRINKING-FOUNTAIN.

1,005,659. Specification of Letters Patent. Patented Oct. 10, 1911.

Application filed January 25, 1911. Serial No. 604,602.

*To all whom it may concern:*

Be it known that I, WILLIAM A. SEXTON, of Somerville, in the county of Middlesex and State of Massachusetts, have invented certain new and useful Improvements in Poultry Drinking-Fountains, of which the following is a specification.

This invention relates to a poultry drinking fountain comprising a reservoir having a filling opening at one end and a pan or trough detachably secured to the reservoir in position to surround the filling opening and project above the same, the reservoir being provided with one or more outlets adjacent to its receiving opening and arranged to permit the escape of sufficient water from the reservoir to charge the pan, and to be sealed by the accumulation of water in the pan to prevent further discharge until the supply in the pan is reduced, the reservoir being closed excepting at such filling and discharge openings so that water is supported in it by atmospheric pressure when the pan is charged.

The invention has for its object to provide a simple and inexpensive construction of reservoir and pan having means for detachably connecting said parts by friction in such manner as to securely hold the parts in engagement and to permit their disengagement by a tipping or tilting movement of the pan relatively to the reservoir.

The invention consists in the improvements which I will now proceed to describe and claim.

Of the accompanying drawings which form a part of this specification,—Figure 1 represents a side elevation of a fountain embodying my invention, a portion of the curb of the pan being broken away; Fig. 2 represents a longitudinal vertical section showing the fountain mounted on a vertical support; Fig. 3 represents a side view showing the reservoir in position for filling, the pan being shown by dotted lines; and Fig. 4 represents a top view of a portion of the pan.

Similar reference characters indicate the same or similar parts in all the figures.

The reservoir of my improved fountain comprises a body portion 12, which is of cylindrical form, and has a closed end or head 13, a tapering breast 14, and a reduced cylindrical neck or mouth portion 15, the outer end of which is preferably rolled or bent to form an annular stiffening flange 16.

The pan of my improved fountain comprises a circular bottom 17, and a circular margin or curb 18. The bottom 17 is provided with an upwardly projecting coupling shoulder 19, the external surface of which is cylindrical and is formed to have a close frictional locking fit on the cylindrical interior surface of the neck 15 adjacent to the stiffening flange 16.

The coupling shoulder 19 is rigidly backed so that it cannot yield inwardly to decrease its diameter, said shoulder being preferably formed by pressing the central portion 17$^a$ of the bottom of the pan upwardly into the interior of the pan, said offset portion and the shoulder 19 constituting a circular boss which is surrounded by the outer portion 17 of the pan bottom.

When the reservoir is in the position shown by Fig. 3, the pan may be frictionally locked to it by forcing the coupling shoulder 19 into the neck 15 until the portion 17 of the pan bottom comes in contact with the stiffening flange 16, the bottom portion 17 constituting a seat for the neck of the reservoir. When the parts are thus engaged, it is practically impossible, owing to the cylindrical form of the shoulder 19 and the close locking fit of the said shoulder on the interior of the neck 15, to remove the pan from the reservoir, or the reservoir from the pan so long as the bottom of the pan remains parallel with the outer end of the neck 15. I mean by this that the pressure of the contents of the reservoir, when the latter is inverted, as shown by Figs. 1 and 2, cannot possibly displace the pan, and that the described connection between the pan and the reservoir cannot be broken except by extremely heavy pressure, unless the bottom of the pan is tipped or inclined, as indicated by dotted lines in Fig. 3.

The engagement between the reservoir and pan is sufficient to prevent the reservoir from being accidentally tipped and overturned when the device is in use and the pan rests on a support. The reservoir therefore, requires no support excepting that afforded by the pan, hence, the portion of the pan surrounding the neck of the reservoir is entirely unobstructed and constitutes an annular open trough from any part of which fowls may drink.

Owing to the fact that the coupling shoulder 19 is concentric with the curb 18 of the pan, and that said curb is separated at all points by a considerable space from the shoulder 19, any part of the curb may be utilized as a handle whereby the pan may be tilted or inclined when the parts are in the position shown by Fig. 3. When pressure is exerted against the curb at one side of the neck of the reservoir tending to incline the pan, the frictional locking engagement between the pan and the neck of the reservoir is easily broken, the opposite side of the neck, bearing on the bottom of the pan, constituting a fulcrum on which the bottom of the pan is tipped.

The reservoir neck 15 is provided with one or more small outlets 20 located below the outer edge of the curb when the reservoir is inverted, said outlet permitting enough water to escape from the reservoir to charge the pan, and being sealed by the charge when the water reaches a sufficient height.

The reservoir body is provided at one edge of its closed end or head with a loop 22 which is bent to form oppositely inclined ears 23, and hinge pintles 24, the latter being engaged with a hinge socket 25 attached to the reservoir body.

When the fountain is in position for use, as shown by Figs. 1 and 2, the loop 22 may be turned upwardly into alinement with one side of the reservoir body and engaged with a hook or suspending device 26 projecting from a vertical support 27, the ears 23 at the same time bearing against the periphery of the reservoir and preventing the ears from swinging outwardly from said periphery, the loop being thus made practically rigid so that the upper end of the reservoir body cannot swing loosely away from the support 27. When the reservoir is in position for filling, as shown by Fig. 3, the ears 23 swing under the head of the reservoir and bear on the ground, the said ears and the loop being substantially parallel with the head of the reservoir.

28 represents a flat seat attached to the reservoir body below the loop 22 and adapted to bear on the support 27 and prevent the reservoir from turning sidewise.

The contraction of the neck 15 is such that all portions of the periphery of the body 12 overhang said neck, so that the pan may be made of relatively small diameter permitting it to occupy a position under the body of the reservoir without conflicting with the support 27, and at the same time providing an unobstructed annular trough of sufficient capacity to permit fowls to drink conveniently, the curb 18 constituting the outer wall of said trough.

It will be seen that when the fountain is in use, the bottom of the pan may bear directly on the ground, the described frictional locking connection between the pan and reservoir, due to the cylindrical form of the periphery of the boss and of the interior of the neck, and also to the fact that the flange 16 of the neck bears on the bottom of the pan around the boss, being of sufficient strength to prevent liability of the reservoir being accidentally tipped and disconnected from the pan.

Since the curb 18 does not support the reservoir, said curb may be made relatively narrow or low and integral with the bottom of the pan, as shown by Fig. 2, the curb being of tapering form so that the entire pan may be economically manufactured by dies without seams or joints.

It will be further seen that the shoulder 19, formed by the margin of the boss and surrounded by the outer portion of the bottom of the pan, projects upwardly from said surrounding portion and is of uniform diameter from its junction with the surrounding portion to the central portion 17$^a$ constituting the crown of the boss. The width or height of said shoulder is much less than the diameter of the boss so that the internally cylindrical neck of the reservoir is adapted, by a relatively short downward movement, to have a tight frictional fit on all parts of said shoulder. The downward movement of the reservoir upon the boss is limited by the bearing of the end of the reservoir neck upon the surrounding portion of the bottom of the pan. When the neck of the reservoir comes to a bearing on the bottom of the pan, the reservoir and pan are interlocked in such manner as to strongly resist separation by a rectilinear movement of one part relatively to the other, and to strongly resist separation by a tipping movement of one of the parts. When the parts are interlocked, there is no possibility of their separation by the downward pressure of the body of the liquid in the reservoir when the device is in position for use as shown by Figs. 1 and 2. When the device is in the position shown by Fig. 3, the pan may be readily disengaged by tipping it, as indicated by dotted lines, the uniform projection of all parts of the curb of the pan from the shoulder 19 enabling any part of the curb to be utilized as a handle. As already stated, the resistance to separation by a tipping movement is much less than the resistance to separation by a rectilinear movement, so that, while there is a strong engagement between the parts when the device is in use, this engagement can be readily broken when it is desired to separate the parts.

I claim,—

1. A poultry drinking fountain comprising a pan having on its bottom a circular boss surrounded by the outer portion of the bottom and forming a narrow upwardly projecting cylindrical shoulder of uniform diameter from the junction of the boss with the surrounding portion of the bottom to the crown of the boss, the width or height of the said shoulder being much less than the diameter of the boss, and a reservoir having an internally cylindrical neck the interior of which is formed to have a tight frictional fit on all parts of said shoulder, whereby the reservoir and pan are interlocked to strongly resist separation by a rectilinear movement of one part relatively to the other, and to less strongly resist separation by a tipping movemnt of one of the parts, the mouth of the reservoir bearing on the surrounding portion of the bottom of the pan when the parts are interlocked, and the pan being provided with a curb which projects uniformly from all parts of the boss, whereby any part of said curb may be utilized as a handle whereby the pan may be tipped to disengage it from the reservoir.

2. A poultry drinking fountain comprising a cylindrical reservoir having a contracted neck portion and a body portion which is closed at one end and overhangs the neck portion when the reservoir is mounted, and a circular pan formed to surround the neck portion of the reservoir, and having its curb or margin located under the body portion thereof, whereby the reservoir and pan may be located at one side of a vertical support with which the reservoir is engaged, the reservoir body being provided at one edge of its closed end with a hinged loop adapted to swing upwardly from the said end into alinement with one side of the reservoir to engage a projection on said support and having stop arms adapted to bear against one side of the body and limit the upward swinging of the loop, the loop and arms being adapted to swing to a position substantially parallel with the closed end of the reservoir, the reservoir body being also provided with an elongated rest located between the said loop and pan, adapted to bear against said support and prevent the reservoir from turning when the loop is engaged with said projection.

In testimony whereof I have affixed my signature, in presence of two witnesses.

WILLIAM A. SEXTON.

Witnesses:
C. F. BROWN,
P. W. PEZZETTI.

Copies of this patent may be obtained for five cents each, by addressing the "Commissioner of Patents, Washington, D. C."